UNITED STATES PATENT OFFICE.

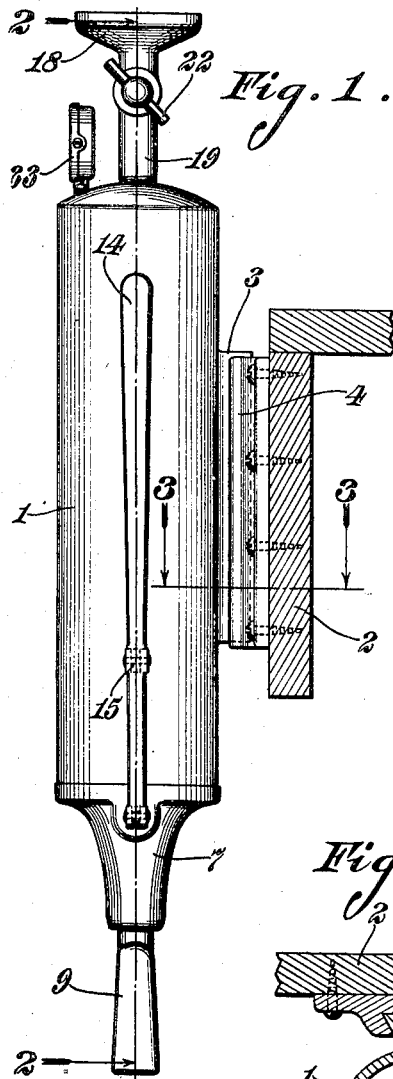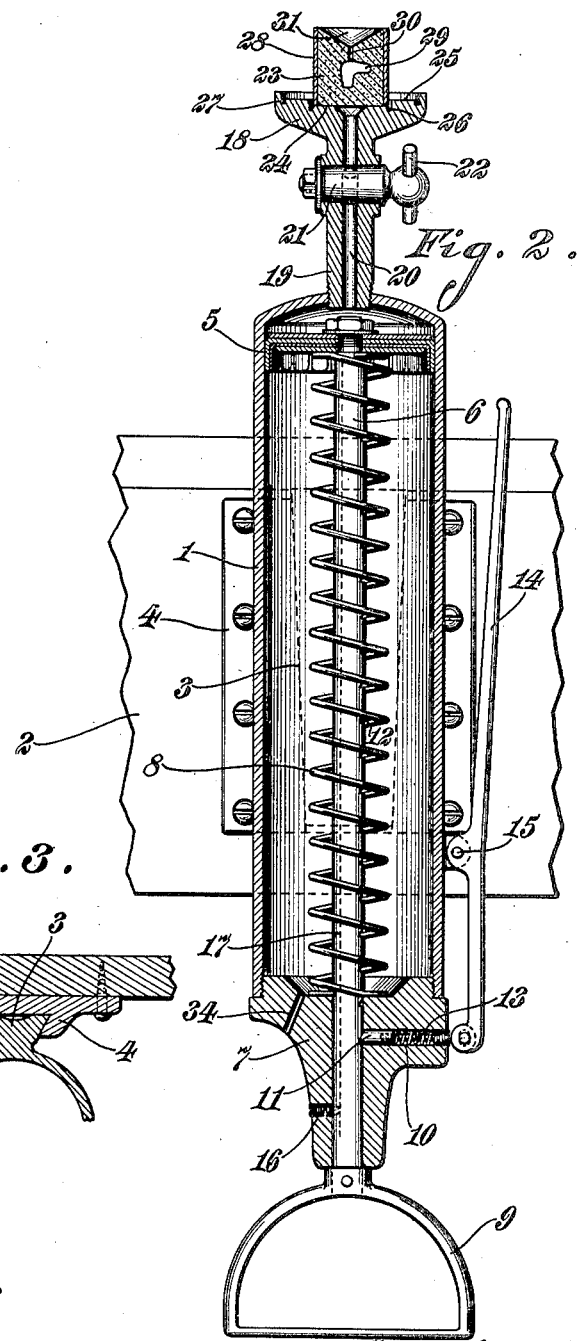

WILLIAM G. TONKINSON AND ALBERT G. HAUSAM, OF ST. LOUIS, MISSOURI.

DENTAL-INLAY-CASTING MACHINE.

1,324,326.  Specification of Letters Patent.  Patented Dec. 9, 1919.

Application filed December 18, 1916. Serial No. 137,676.

*To all whom it may concern:*

Be it known that we, WILLIAM G. TONKINSON and ALBERT G. HAUSAM, both citizens of the United States, and residing at St. Louis, in the State of Missouri, have invented a certain new and useful Improvement in Dental-Inlay-Casting Machines, of which the following is a specification.

This invention relates to dental machines or appliances such as are employed in making castings for dental inlays and for other classes of dental metal work.

These machines embody in their organization a mold composed, usually, of some suitable investing material having a mold cavity suitably formed therein and into which cavity the casting metal is introduced in a molten state and under pressure, through an opening or sprue.

The manner in which the pressure is obtained in the mold and the effectiveness of the pressure produced plays an important part in the operation of the machine and in the quality of the resultant casting. Wherefore, many casting appliances, differing chiefly in the proposed manner of producing the desired pressure, have been devised in an effort to perfect the pressure obtained. The resultant various types of machines include what are known as vacuum casting appliances, which contemplate exhausting the air from the mold in order to create a negative pressure therein and allow the metal to flow into the mold under atmospheric pressure.

Appliances of this type as heretofore devised, have proven more or less objectionable and defective in use, for the reason that they are difficult to mount and operate; entail considerable loss of time in their preparatory manipulation to exhaust the mold; and, while in action, are exceedingly liable to become clogged in their connections thus breaking communication between them and the mold and destroying negative pressure in the latter.

The present invention, directed more particularly to vacuum casting appliances, has among its objects to overcome the above noted objections and defects, by providing a comparatively simple, inexpensive appliance which may be readily mounted for use; one which is capable of rapid manipulation in exhausting the mold; and one wherein liability of communication with the mold being interrupted through clogging of the connections, is wholly obviated.

Further objects of the invention are to provide such an appliance wherein the piston may be quickly and forcibly moved in obtaining a predeterminate initial pressure, and one in which said piston will be automatically locked for holding the appliance to such initial pressure.

Further objects of the invention are to provide an appliance adapted to and for ready operation with any one of a plurality of molds of relatively varying sizes.

With the above and other objects in view the invention comprises the novel features of construction and combination of parts more fully hereinafter described.

In the accompanying drawings,

Figure 1 is a side elevation of a vacuum appliance embodying the invention;

Fig. 2 is a vertical longitudinal section taken centrally therethrough on the line 2—2 of Fig. 1, and showing an inlay mold arranged on the mold receiving table;

Fig. 3 is a detail view in section taken on the line 3—3 of Fig. 1; and,

Fig. 4 is an enlarged view in section of the mold table of Fig. 2, showing a larger mold in position thereon.

Referring to the drawings, 1 designates a cylinder preferably of elongated form as shown and adapted in practice to be mounted vertically on a work bench or other support 2, the cylinder being to this end, provided with a longitudinally extending dovetailed lug or cleat 3 formed for engagement with a dove-tailed bracket 4 suitably attached to the support 2.

Arranged to operate in the cylinder is a piston 5 fixed upon the upper end of a rod 6 slidable longitudinally through a bearing 7 removably tapped into the lower end of the cylinder and forming a closure therefor, there being arranged on said rod within the cylinder, a normally expanded spring 8 having bearing at one end against the piston 5 and at its other end against the closure 7 and tending to normally hold the piston in raised position, while attached to the lower end of the rod 6 is a stirrup 9 constructed and arranged to receive the operator's foot and thus permit the application of foot power in effecting a rapid and forcible movement of the piston for the purpose which will presently appear.

Slidably disposed in a bearing socket 10 in the part 7 is a latching plunger 11 formed for engagement at its inner end with any one of a series of teeth or notches 12 provided on the piston rod 6, the latch 11, which is pressed normally to engaging position by means of a spring 13 being engaged at its other end with the lower end of an actuating lever 14 in turn pivoted between its ends at 15 in suitable bearing ears formed on the cylinder 1, while tapped into the part 7 is a pin 16 whose inner end engages a longitudinal groove 17 formed in the rod 6 to prevent rotation of the latter and maintain the notches or teeth 12 in proper coöperative relation to the latch 11.

Provided at the upper end of the cylinder 1 is a casting table 18 preferably formed on the upper end of a vertical tubular connection 19, tapped into the upper end of the cylinder and presenting a passageway or duct 20 normally closed by a suitable cock 21 equipped with, and to be manipulated by, a finger piece 22 to open the duct and establish communication between vacuum cylinder 5 and the investing material 23 of a mold when mounted on the table 18.

In order to adapt the device for use with any one of a plurality of molds of relatively varying sizes, the table 18 has formed upon its upper active face a plurality of mold receiving seats or portions 24 and 25 stepped one above the other and bounded respectively by marginal grooves 26 and 27, adapting said seats to be accurately ground to receive the molds which are preferably of the form shown, comprising a vertical ring or flask 28 to receive the investing material 23 in which is formed the mold cavity 29 into which the molten metal enters through an opening or sprue 30 from the depression 31 in which the metal is placed and melted in a well known manner.

The central minor seat or portion 24 is adapted in practice to receive the smaller size mold as seen in Fig. 2, while the other or major portion or seat 25 is adapted to accomodate a larger size mold as shown in Fig. 4, there being provided for use beneath the larger mold a perforated plate or shield 32 which, when arranged in place, bridges the smaller seat 24 beneath the larger mold and supports the investing material within the latter.

Mounted on the upper end of cylinder 5 is a pressure gage 33, of suitable form, and adapted to indicate the pressure in the cylinder 5 and therefore in the mold, as will be readily understood. The bearing 7 is provided with an aperture 34 to relieve the air pressure below the piston.

In practice the mold having been prepared in the usual way is seated upon the table 18 and the cock 21 turned to close the passage 20. The dentist now places his foot in the stirrup 9 and forces the piston downward against the action of spring 8. This operation of the piston causes the air in the cylinder to expand so that the air pressure will be less than atmospheric pressure, as indicated by the gage 33, it being understood that the value of pressure thus obtained will vary according to variations in the length of movement of the rod or, that is, the stroke of the piston, and that during this movement of the piston, the latch 11 will ride freely over the teeth 12, but will, when the desired negative pressure has been secured, operate automatically to engage one of said teeth for locking the piston in depressed position when pressure is removed from stirrup 9. At this point it is to be noted that the cylinder is of large capacity and that the piston is constructed and arranged for quick forcible movement whereby the action is rapid and positive, thus permitting of the predeterminate initial pressure being quickly obtained. The metal is now placed on the mold and melted in the usual manner, and the cock 21 is now opened to open communication between the cylinder and the mold and establish a negative pressure in the mold cavity. Atmospheric pressure acting on the molten metal will then force the same through the opening or sprue 30 into the cavity 29, it being observed that inasmuch as the air has been previously exhausted from the mold no resistance will be offered to the inflowing metal which may thus perfectly fill the cavity 29 and form a perfect casting. After the casting operation has been completed and the mold removed from the table, the lever 14 may be manipulated to disengage latch 11 from the rod 6 and permit the piston to be returned to normal position by the spring 8. Attention is further directed to the fact that in the operation of the device, any particles of the material 23 which may be drawn from the mold or which may in any manner become dislodged and be deposited in the passageway 20, will owing to the vertical arrangement of the appliance, pass freely through said passageway into the cylinder 1 which may be readily cleaned from time to time by unscrewing the closure piece 7 and removing the plunger from the piston. It will further be observed that owing to the arrangement of the perforated shield beneath the larger mold when seated on the table, the recess formed by the smaller mold seat will be bridged and the investing material within the larger mold properly supported from beneath while at the same time, this shield will in no wise interfere with the action of the appliance in exhausting the air from the mold.

From the foregoing it is apparent that the appliance accomplishes its stated objects in the attainment of which the invention is not to be restricted to the details herein set forth inasmuch as various minor changes may be made in said details without departing from the spirit or scope of the invention.

Having thus described the invention, what is claimed is:

1. An appliance for use in making dental castings, comprising, a cylinder, means associated therewith for placing said cylinder in operative communication with the investing material of a dental casting mold, a piston operating in said cylinder to exhaust the air from the mold, and means for locking said piston at a predetermined position in its exhausting stroke, adapted to maintain the established reduced pressure.

2. An appliance for use in making dental castings comprising a cylinder, means associated therewith for placing said cylinder in operative communication with the investing material of a dental casting mold, a piston operating in said cylinder to exhaust the air from the mold, and means for automatically locking said piston at any desired position in its exhausting stroke, adapted to maintain the established reduced pressure.

3. An appliance for use in making dental castings comprising a cylinder, means associated therewith for placing said cylinder in operative communication with the investing material of a dental casting mold, a piston operating in said cylinder, means for operating said piston to exhaust the air from the mold, a spring for returning said piston, and means for locking said piston against return by said spring at a predetermined position in its exhausting stroke, adapted to maintain the established reduced pressure.

4. An appliance for use in making dental castings, comprising a cylinder, means associated therewith for placing said cylinder in operative communication with the investing material of a dental casting mold, a piston operating in said cylinder to exhaust the air from the mold, means for locking said piston at a predetermined position in its exhausting stroke, adapted to maintain the established reduced pressure, and means for releasing said piston.

5. An appliance for use in making dental castings in molds, comprising a cylinder of large capacity compared to the molds, a mold carrier mounted on said cylinder adapted to place the investing material in communication with said cylinder, a piston operating in said cylinder to exhaust the air from the mold, means for supporting said cylinder and its associated mold carrier, and a pedal attached to said piston and adapted for operation by the foot of the operator to move the piston on its exhausting stroke.

6. An appliance for use in making dental castings in molds, comprising a cylinder of large capacity compared to the molds, a mold carrier mounted on said cylinder adapted to place the investing material in communication with said cylinder, a piston operating in said cylinder to exhaust the air from the mold, a spring for returning said piston, means for supporting said cylinder and its associated mold carrier, and a pedal attached to said piston and adapted for operation by the foot of the operator to move the piston on its exhausting stroke.

7. An appliance for use in making dental castings in molds, comprising a cylinder of large capacity compared to the molds, a mold carrier mounted on said cylinder adapted to place the investing material in communication with said cylinder, a piston operating in said cylinder to exhaust the air from the mold, means for supporting said cylinder and its associated mold carrier, a pedal attached to said piston and adapted for operation by the foot of the operator to move the piston on its exhausting stroke, and means for locking said piston at a predetermined position in its exhausting stroke, adapted to maintain the established reduced pressure.

In testimony whereof we affix our signatures this 12th day of Sept., 1916.

WILLIAM G. TONKINSON.
ALBERT G. HAUSAM.